(12) United States Patent
Kannatti et al.

(10) Patent No.: US 11,865,873 B2
(45) Date of Patent: Jan. 9, 2024

(54) WHEEL END ASSEMBLY HAVING AN ANNULAR HUB CHAMBER

(71) Applicant: ArvinMeritor Technology, LLC, Troy, MI (US)

(72) Inventors: Vittal Kannatti, Troy, MI (US); Nimesh Meghpara, Troy, MI (US); William Bishop, Troy, MI (US); Kou Yang, Warren, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 325 days.

(21) Appl. No.: 17/154,031

(22) Filed: Jan. 21, 2021

(65) Prior Publication Data
US 2022/0227185 A1 Jul. 21, 2022

(51) Int. Cl.
*B60C 23/00* (2006.01)

(52) U.S. Cl.
CPC .. *B60C 23/00318* (2020.05); *B60C 23/00363* (2020.05)

(58) Field of Classification Search
None
See application file for complete search history.

(56) References Cited

U.S. PATENT DOCUMENTS

| | | | |
|---|---|---|---|
| 4,440,451 A * | 4/1984 | Goodell | B60C 23/00372 301/105.1 |
| 9,283,818 B2 | 3/2016 | Kenney et al. | |
| 9,315,077 B2 | 4/2016 | Flory et al. | |
| 9,333,813 B2 | 5/2016 | Tiziani et al. | |
| 9,428,016 B2 | 8/2016 | Kenney et al. | |
| 9,452,644 B2 | 9/2016 | Kenney et al. | |
| 9,452,645 B2 | 9/2016 | Polubinski | |
| 9,481,213 B2 | 11/2016 | Keeney et al. | |
| 9,517,663 B2 | 12/2016 | Lewandowski et al. | |
| 9,539,865 B2 | 1/2017 | Lakin et al. | |
| 9,809,065 B2 | 11/2017 | Polubinski et al. | |
| 9,873,295 B2 * | 1/2018 | Tsiberidis | B60C 23/00336 |
| 10,035,384 B2 | 7/2018 | Kenney et al. | |
| 10,052,923 B2 | 8/2018 | Power et al. | |
| 2015/0290986 A1 | 10/2015 | Tsoberidis | |

FOREIGN PATENT DOCUMENTS

| | | | |
|---|---|---|---|
| DE | 102014108028 B3 * | 9/2015 | B60B 27/0047 |
| WO | 2008/063863 A2 | 5/2008 | |

OTHER PUBLICATIONS

Extended European Search Report dated Jun. 13, 2022 for related European Appln. No. 22152449.9; 7 Pages.
U.S. Appl. No. 16/878,702, filed May 20, 2020 28 pages.
U.S. Appl. No. 16/991,869, filed Aug. 12, 2020 25 pages.

* cited by examiner

*Primary Examiner* — Scott A Browne
(74) *Attorney, Agent, or Firm* — Brooks Kushman PC

(57) ABSTRACT

A wheel end assembly having a spindle, a hub, and a rotary seal assembly. The spindle may have a spindle air passage. The hub may have a hub air passage and an annular hub chamber that may extend around an axis. The rotary seal assembly may fluidly connect the spindle air passage to an inlet of the annular hub chamber.

20 Claims, 6 Drawing Sheets

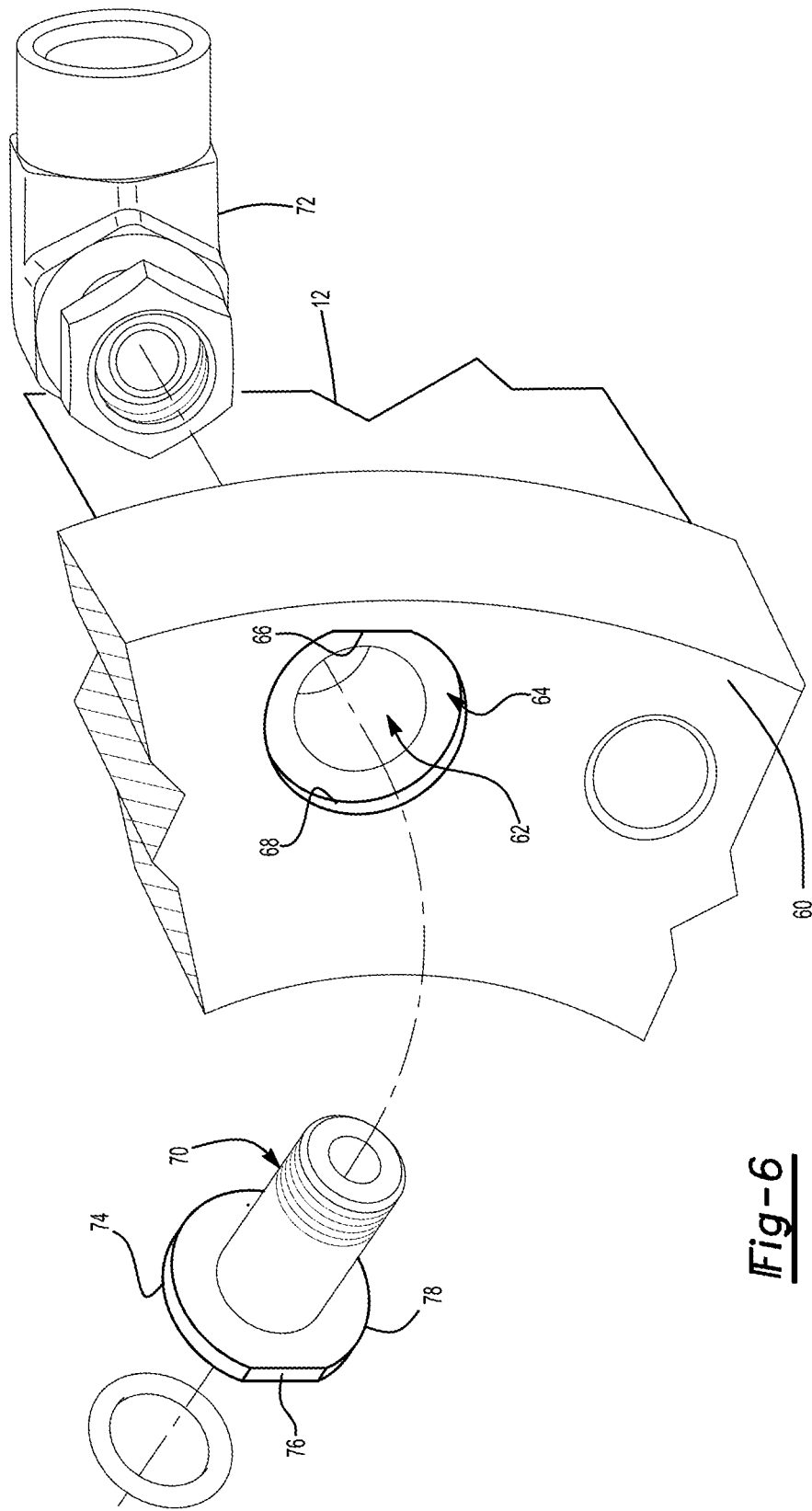

WHEEL END ASSEMBLY HAVING AN ANNULAR HUB CHAMBER

TECHNICAL FIELD

This document relates to a wheel end assembly that may have a wheel hub that may define an annular hub chamber. The annular hub chamber may help fluidly connect a tire inflation system to a wheel.

BACKGROUND

A tire inflation system having a passage for routing pressurized gas through a hub is disclosed in U.S. Pat. No. 9,315,077.

SUMMARY

In at least one embodiment a wheel end assembly is provided. The wheel end assembly may include a spindle, a hub, and a rotary seal assembly. The spindle may be disposed along an axis and may define a spindle air passage. The hub may be rotatable about the axis with respect to the spindle. The hub may define an annular hub chamber and at least one hub air passage. The annular hub chamber may extend around the axis. The hub air passage may have first port and a second port. The first port may be is fluidly connected to the annular hub chamber. The second port may be adapted to be fluidly connected to a wheel. The rotary seal assembly may fluidly connect the spindle air passage to a port of the annular hub chamber.

In at least one embodiment a wheel end assembly is provided. The wheel end assembly may include a spindle, a hub, and a rotary seal assembly. The spindle may be disposed along an axis and may define a spindle air passage. The hub may be rotatable about the axis with respect to the spindle. The hub may define an inner side, an annular hub chamber, and at least one hub air passage. The inner side may face toward the spindle. The annular hub chamber may extend around the axis and may have a port. The port may be at least partially defined by a first side wall and a second side wall that may be spaced apart from each other and that extend away from the spindle from the inner side. The hub air passage may have a first port and a second port. The first port of the hub air passage may be fluidly connected to the annular hub chamber. The second port of the hub air passage may be adapted to be fluidly connected to a wheel. The rotary seal assembly may fluidly connect the spindle air passage to the inlet of the annular hub chamber.

BRIEF DESCRIPTION OF THE DRAWINGS

FIG. 6 is an exploded view of a portion of the wheel end assembly showing a bushing that facilitates a fluid connection to a pressurized gas source.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
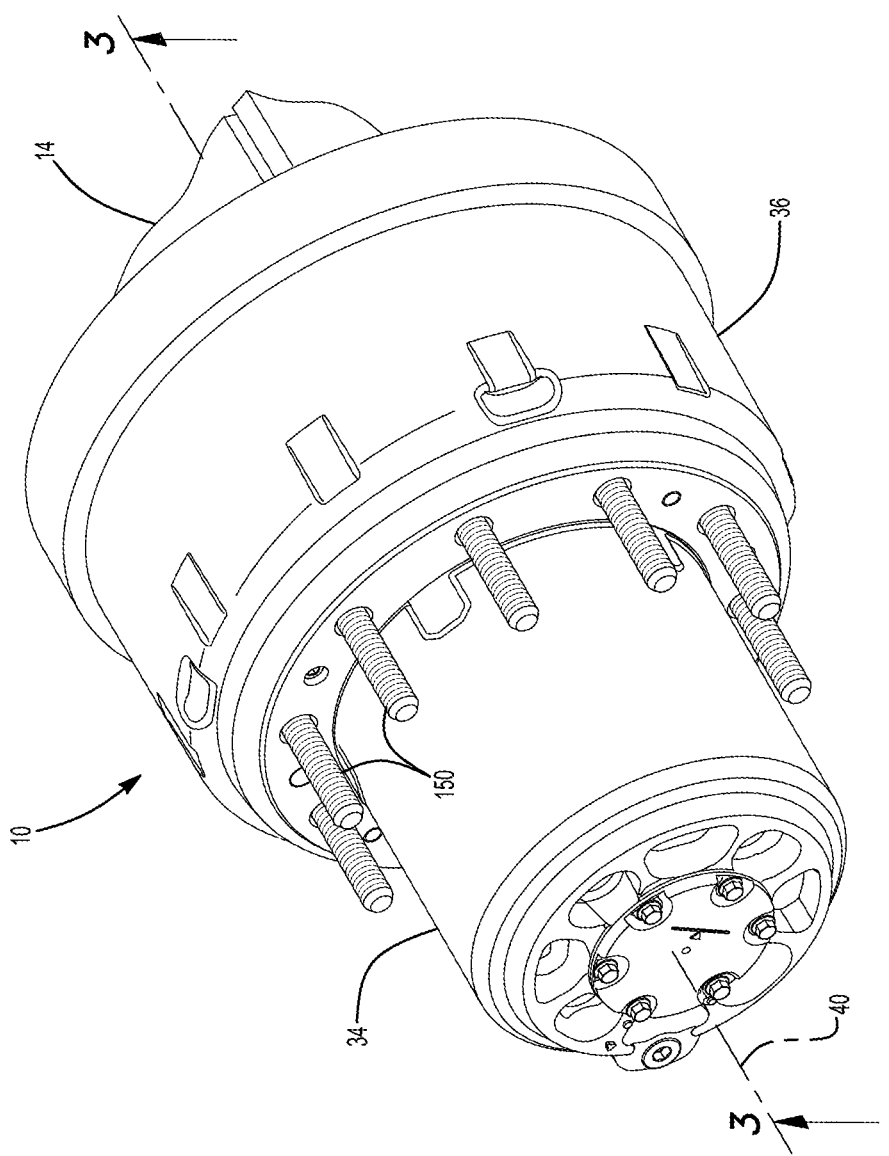
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

As an overview, the wheel end assembly 10 may be associated with a tire inflation system that may help obtain and/or maintain a desired air pressure within one or more tires. The tire inflation system may be disposed on the vehicle and may be configured to provide a pressurized gas or pressurized gas mixture to one or more tires and exhaust the pressurized gas or pressurized gas mixture from one or more tires. For clarity, the term "pressurized gas" may refer to either a purified pressurized gas (e.g., nitrogen) or a pressurized gas mixture (e.g., air). For convenience in reference, the term "air" is used below as a generic designator that is not intended to be limiting to a particular pressurized gas (e.g., an "air passage" may facilitate the flow of a pressurized gas other than air). Tire inflation or deflation may be desired when the tire pressure is not sufficiently close to the tire pressure specified by the vehicle manufacturer and/or is inappropriate for the type of ground over which a vehicle is travelling. For instance, higher tire pressures may be desired when a vehicle is travelling on a paved road as compared to when a vehicle is travelling off-road.

Figure 3:
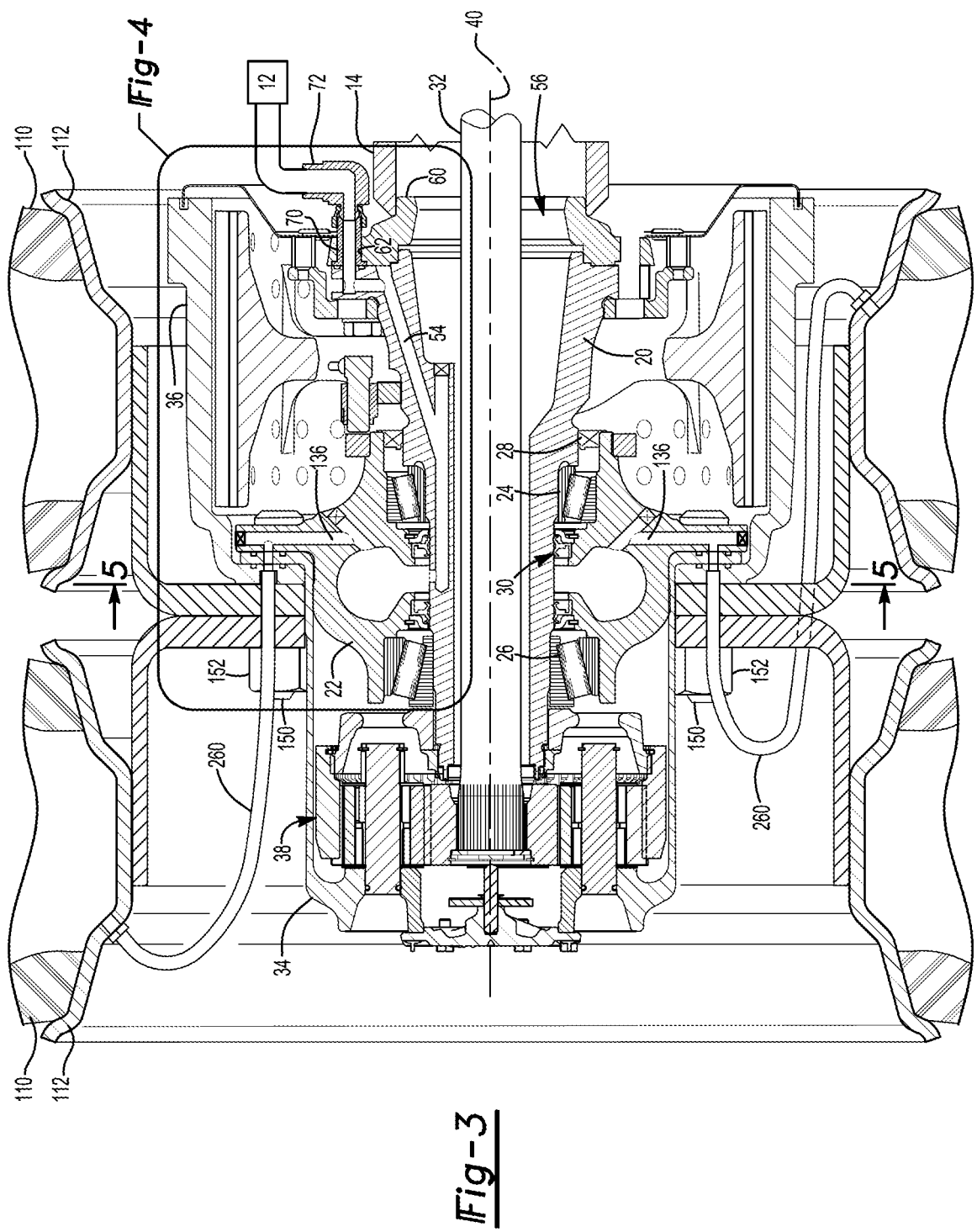
FIG. 3 is a section view along section line 3-3 that adds at least one wheel and tire.

The tire inflation system may be fluidly connected to a pressurized gas source 12, which is best shown in FIG. 3. The pressurized gas source 12 may be configured to supply or store a volume of a pressurized gas. For example, the pressurized gas source 12 may be a tank, a pump like a compressor, or combinations thereof. The pressurized gas source 12 may be configured to provide pressurized gas at a pressure that is greater than or equal to a desired inflation pressure of a tire. The pressurized gas source 12 may be disposed on the vehicle and may be fluidly connected to at least one tire via passages in various components.

Referring again to FIG. 1, the wheel end assembly 10 may be configured to support a vehicle wheel and a brake assembly. The wheel end assembly 10 may be disposed on or may be mounted to a structural component 14 and may be provided in a steerable configuration or a non-steerable configuration. In a steerable configuration, the wheel end assembly 10 may be mounted to a steerable structural component, such as a steering knuckle. In a non-steerable configuration, the wheel end assembly 10 may be mounted to a non-steerable structural component, such as a non-rotatable knuckle or an axle housing of an axle assembly. In at least one configuration and as is best shown with reference to FIGS. 2 and 3, the wheel end assembly 10 may include a spindle 20, a hub 22, an inboard wheel bearing 24, an outboard wheel bearing 26, a hub seal 28, and a rotary seal assembly 30. Optionally, the wheel end assembly 10 may be associated with an axle shaft 32 and may include hub housing 34, a brake drum 36, and a gear reduction unit 38, which is best shown in FIG. 3.

Figure 2:
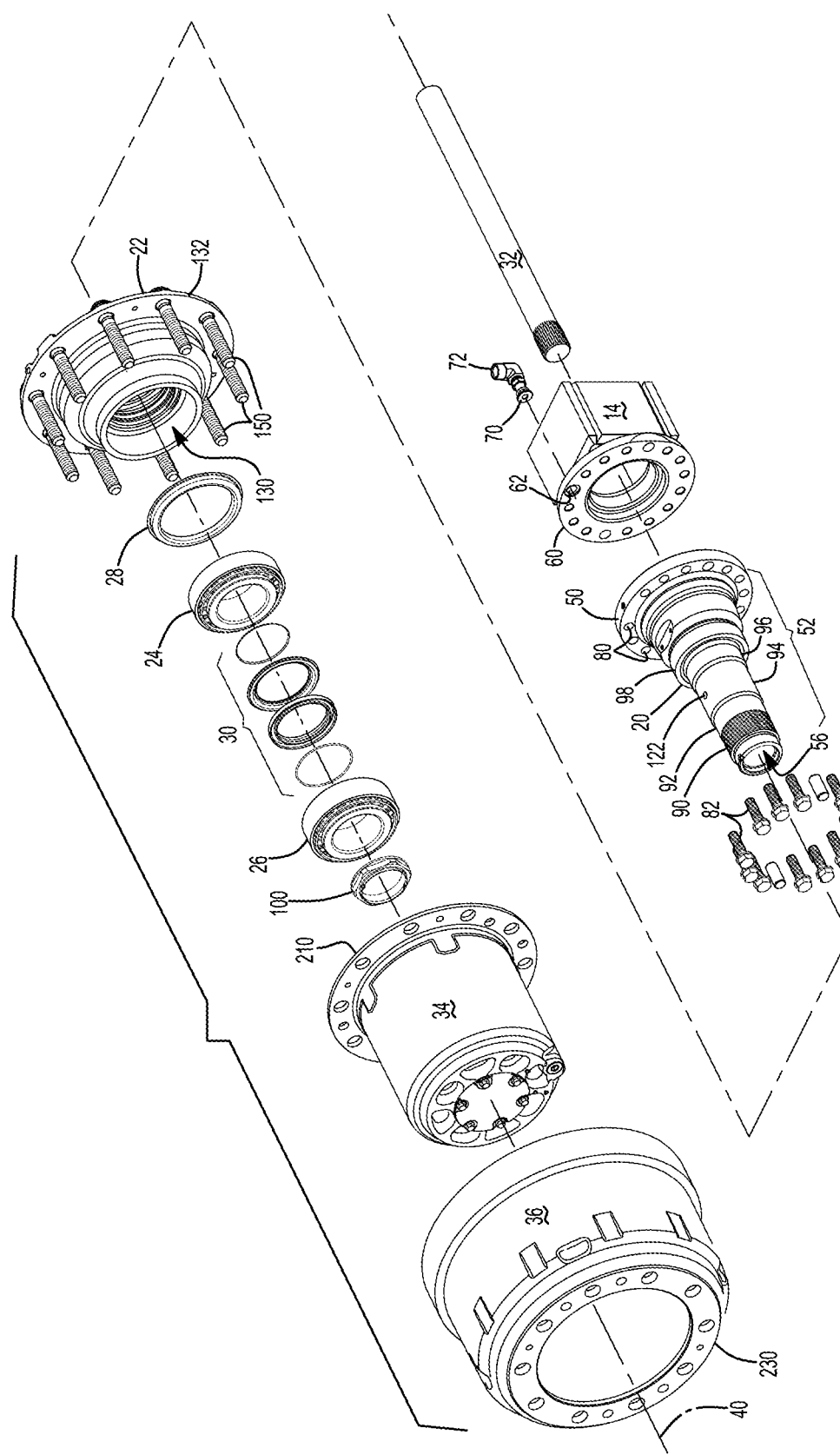
FIG. 2 is an exploded view of a portion of the wheel end assembly.

Referring to FIGS. 2 and 3, the spindle 20 may extend along or around an axis 40 and may be configured to support components of the wheel end assembly 10. The spindle 20 may be fixedly mounted to a structural component 14, such as a steering knuckle or an axle housing as previously described. It is also contemplated that the spindle 20 may be integrally formed with the structural component 14 rather than being a separate part from the structural component 14. In at least one configuration, the spindle 20 may include a mounting flange 50 and a tubular portion 52. In addition, the spindle 20 may define a spindle air passage 54 and optionally a spindle hole 56.

The mounting flange 50 may facilitate mounting of the spindle 20 to a structural component 14. For instance, the structural component 14 may include a mounting ring 60 that may be integrally formed with the structural component 14 or may be provided as a separate part that is fixedly attached to structural component 14. The mounting ring 60 may extend around the axis 40, may be received inside a hole in the structural component 14, and/or may have holes that facilitate mounting of the spindle 20. As is best shown with in FIGS. 2 and 6, the mounting flange 50 may have an air passage hole 62.

Referring to FIG. 6, the air passage hole 62 may be a through hole that may extend through the mounting ring 60. The air passage hole 62 may have a recess 64. The recess 64 may have any suitable shape. For instance, the recess 64 may be generally D-shaped and may include a straight side 66 and a curved side 68 that extends along an arc or radius from one end of the straight side 66 to an opposite end of the straight side 66.

A hollow tubular bushing 70 may extend through the air passage hole 62 and may facilitate mounting of a fitting 72 that may be fluidly connectable to the pressurized gas source 12. The bushing 70 may have a shape that is compatible with the air passage hole 62. For instance, the bushing 70 may have a bushing flange 74 that may be received in the recess 64 to help inhibit rotation of the bushing 70 with respect to the mounting ring 60. In the configuration shown, the bushing flange 74 may have a D-shaped perimeter that may have a straight bushing flange side 76 and a curved bushing flange side 78 that extends along an arc or radius from one end of the straight bushing flange side 76 to an opposite end of the straight bushing flange side 76. The straight bushing flange side 76 and a curved bushing flange side 78 may be aligned with the straight side 66 and a curved side 68, respectively. It is also contemplated that the bushing 70 may be omitted and that the fitting 72 may be directed coupled to the mounting ring 60.

Figure 4:
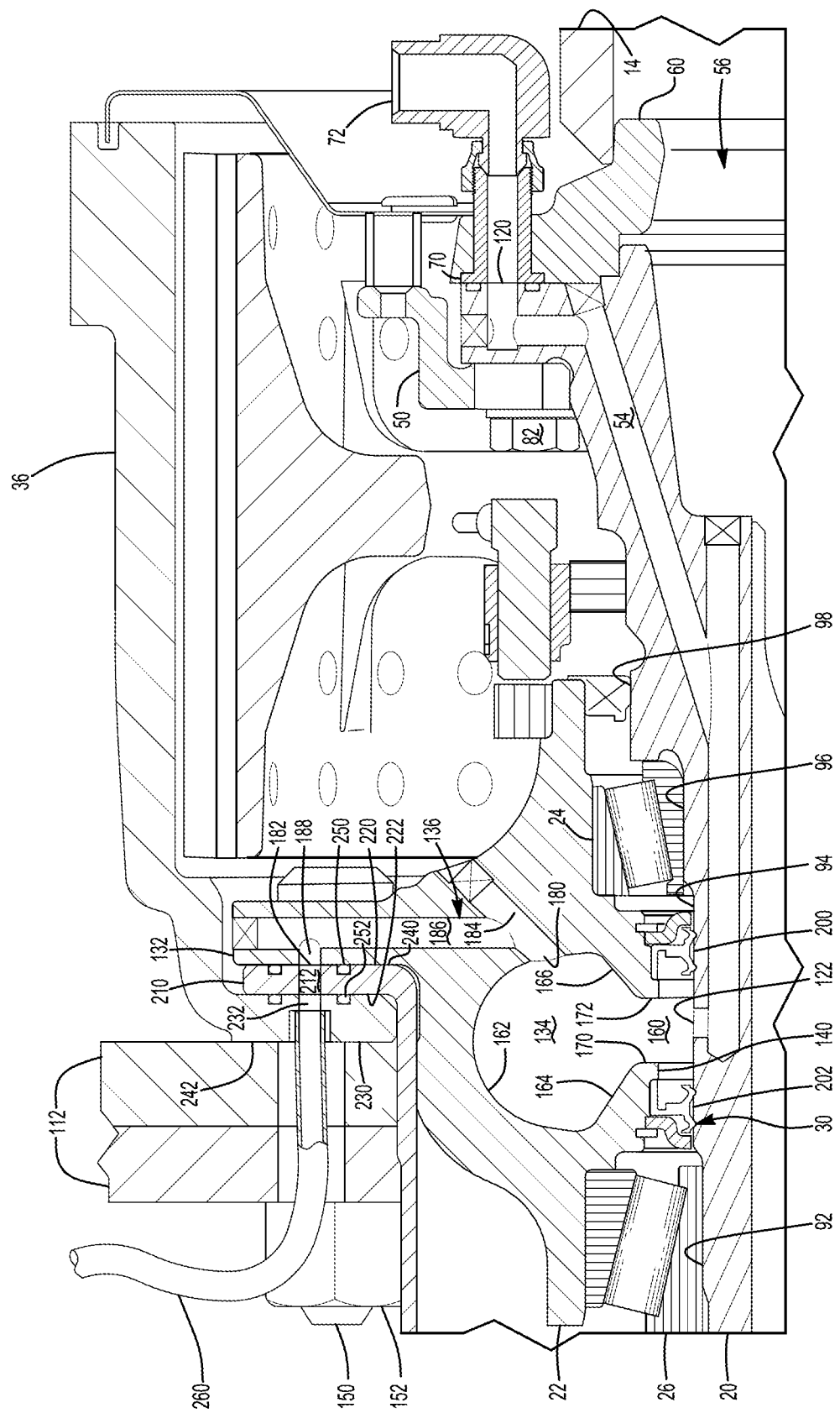
FIG. 4 is a magnified view of a portion of FIG. 3.

Referring to FIGS. 2 and 4, the mounting flange 50 may be disposed at an inboard end of the spindle 20 that may be disposed adjacent to the structural component 14. In at least one configuration, the mounting flange 50 may extend further away from the axis 40 than the tubular portion 52 and may extend radially outward from the tubular portion 52. The mounting flange 50 may include a plurality of holes 80 that may receive fasteners 82, such as bolts, that may couple the spindle 20 to the structural component 14, such as to the mounting ring 60. Alternatively, the holes 80 and fasteners 82 may be omitted and the spindle 20 may be coupled to the structural component 14 with a weld, by press fitting, or the like. The mounting flange 50 may be disposed at an end of the tubular portion 52.

Referring primarily to FIG. 2, the tubular portion 52 may extend from the mounting flange 50. For instance, the tubular portion 52 may extend in an axial direction that may extend away from the mounting flange 50 in an outboard direction away from the structural component 14. In at least one configuration, the tubular portion 52 may have a threaded portion 90. The tubular portion 52 may include one or more outer surfaces, such as a first outer surface 92, a second outer surface 94, a third outer surface 96, and a fourth outer surface 98.

The threaded portion 90 may be axially positioned or positioned along the axis 40 between the distal end of the spindle 20 and the first outer surface 92. The threaded portion 90 may face away from the axis 40 and may threadingly engage a preload nut 100. For instance, the preload nut 100 may be threaded onto the threaded portion 90, may inhibit axial movement of the outboard wheel bearing 26, and may exert a preload force on the outboard wheel bearing 26.

The first outer surface 92 may extend around the axis 40 and may face away from the axis 40. The first outer surface 92 may be an outside circumference of a portion of the tubular portion 52. The first outer surface 92 may be axially positioned between the threaded portion 90 and the second outer surface 94. In addition, the first outer surface 92 may be positioned further from the axis 40 than the threaded portion 90. The outboard wheel bearing 26 may be disposed on the first outer surface 92.

The second outer surface 94 may extend around the axis 40 and may face away from the axis 40. The second outer surface 94 may be an outside circumference of a portion of the tubular portion 52. The second outer surface 94 may be axially positioned between the first outer surface 92 and the mounting flange 50. For instance, the second outer surface 94 may be axially positioned between the first outer surface 92 and the third outer surface 96. In addition, the second outer surface 94 may be disposed further from the axis 40 than the first outer surface 92 and may have a larger diameter than the first outer surface 92 to help inhibit axial movement of the inner race of the outboard wheel bearing 26 toward the mounting flange 50. The rotary seal assembly 30 may be disposed on the second outer surface 94. It is also contemplated that the second outer surface 94 may be omitted and the outboard wheel bearing 26 and the rotary seal assembly 30 may be disposed on a common surface, such as the first outer surface 92.

The third outer surface 96 may extend around the axis 40 and may face away from the axis 40. The third outer surface 96 may be an outside circumference of a portion of the tubular portion 52. The third outer surface 96 may be axially positioned between the second outer surface 94 and the mounting flange 50. For instance, the third outer surface 96 may be axially positioned between the second outer surface 94 and the fourth outer surface 98. In addition, the third outer surface 96 may be disposed further from the axis 40 than the second outer surface 94 and may have a larger diameter than the second outer surface 94. It is also contemplated that the third outer surface 96 may be omitted and the rotary seal assembly 30 may be disposed on a common surface, such as the first outer surface 92 or the second outer surface 94. The inboard wheel bearing 24 may be disposed on the third outer surface 96.

The fourth outer surface 98 may extend around the axis 40 and may face away from the axis 40. The fourth outer surface 98 may be an outside circumference of a portion of the tubular portion 52. The fourth outer surface 98 may be axially positioned between the third outer surface 96 and the mounting flange 50. In at least one configuration, the fourth outer surface 98 may extend from the mounting flange 50. The fourth outer surface 98 may be disposed further from the axis 40 than the third outer surface 96 and may have a larger diameter than the third outer surface 96 to help inhibit axial movement of the inner race of the inboard wheel bearing 24 toward the mounting flange 50. The hub seal 28 may be disposed on the fourth outer surface 98. It is contemplated that the fourth outer surface 98 may be omitted and that the hub seal 28 and the inboard wheel bearing 24 may be disposed on a common surface.

Referring to FIG. 3, the spindle air passage 54 may help fluidly connect a pressurized gas source 12 to a tire 110 that may be mounted on a wheel 112. The spindle air passage 54 may be spaced apart from the spindle hole 56. In at least one configuration, the spindle air passage 54 may extend through the mounting flange 50 and the tubular portion 52 of the spindle 20. As is best shown in FIG. 4, the spindle air passage 54 may have a first port 120 and a second port 122.

The first port 120 may be fluidly connectable to the pressurized gas source 12. In at least one configuration, the first port 120 may be provided in the mounting flange 50.

The second port 122 may be disposed at an opposite end of the spindle air passage 54 from the first port 120. The second port 122 may be fluidly connected to an air passage in the hub 22 via the rotary seal assembly 30. The second port 122 may be provided in the tubular portion 52. For instance, the second port 122 may extend from an outer surface of the spindle 20, such as the second outer surface 94.

The mounting flange 50 and the tubular portion 52 may cooperate to define the spindle hole 56. The spindle hole 56 may be a through hole that may extend along and may be centered about the axis 40.

Referring to FIGS. 2 and 4, the hub 22 may be rotatable about the axis 40 with respect to the spindle 20. In addition, the hub 22 may be configured to facilitate mounting of at least one wheel 112. In a drive axle configuration, the hub 22 may be operatively connected to an axle shaft 32. In at least one configuration, the hub 22 may include a hub cavity 130, a hub mounting flange 132, an annular hub chamber 134, and at least one hub air passage 136.

The hub cavity 130 may extend around the axis 40. The hub cavity 130 may receive at least a portion of various components of the wheel end assembly 10, such as the spindle 20, the inboard wheel bearing 24, the outboard wheel bearing 26, the hub seal 28, the rotary seal assembly 30, and the gear reduction unit 38. The hub cavity 130 may be at least partially defined by an inner side 140 that may face toward the spindle 20 and that may extend around the axis 40.

The hub mounting flange 132 may facilitate mounting of at least one wheel 112. For example, the hub mounting flange 132 may extend away from the axis 40 and may include a set of mounting fastener holes that may each receive a mounting lug bolt 150. A mounting lug bolt 150 may extend through a corresponding hole in a wheel 112. A lug nut 152 may be threaded onto a mounting lug bolt 150 to secure a wheel 112 to the hub 22. In the configuration shown in FIGS. 3 and 4, two wheels 112 are illustrated that each support a corresponding tire 110; however, it is contemplated that a single wheel 112 and tire 110 may be provided.

Figure 5:
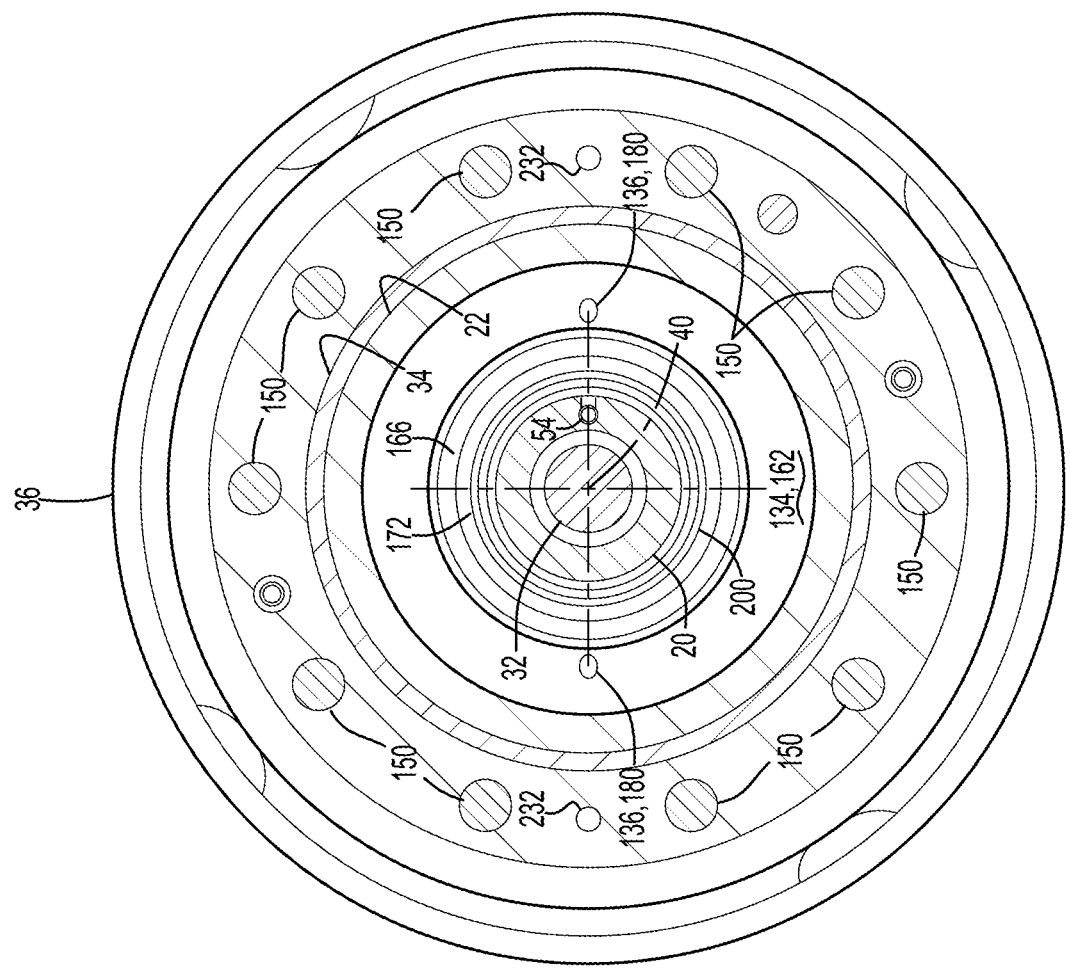
FIG. 5 is a section view along section line 5-5.

Referring primarily to FIGS. 4 and 5, the annular hub chamber 134 may fluidly connect the spindle air passage 54 to at least one hub air passage 136. The annular hub chamber 134 may extend around the axis 40. The annular hub chamber 134 may have a port 160 and may be at least partially defined by an arcuate wall 162. Optionally, the annular hub chamber 134 may be further defined by a first connecting wall 164, a second connecting wall 166, or both.

Referring to FIG. 4, the port 160 may be fluidly connected to the second port 122 of the spindle air passage 54. For instance, the port 160 may be disposed proximate the rotary seal assembly 30. The port 160 may extend continuously around the axis 40. The port 160 may or may not extend from the arcuate wall 162. In at least one configuration, the port 160 may be at least partially defined by a first side wall 170 and a second side wall 172.

The first side wall 170 and the second side wall 172 may be spaced apart from each other. The first side wall 170 and the second side wall 172 may extend from the inner side 140 of the hub 22 in a direction that extends away from the spindle 20. In at least one configuration, first side wall 170 and the second side wall 172 may be disposed substantially perpendicular to the axis 40. Substantially perpendicular may be within ±2° of perpendicular.

Referring to FIG. 4, the arcuate wall 162 may face toward the axis 40 and may extend along an arc. At least a portion of the arcuate wall 162 may be disposed further from the axis 40 than the inboard wheel bearing 24, the outboard wheel bearing 26, or both.

Optionally, a first connecting wall 164 and a second connecting wall 166 may help define the annular hub chamber 134. The first connecting wall 164 may extend from an end of the first side wall 170 to a first end of the arcuate wall 162. The second connecting wall 166 may extend from an end of the second side wall 172 to a second end of the arcuate wall 162 that may be disposed opposite the first end of the arcuate wall 162. It is also contemplated that the first connecting wall 164, the second connecting wall 166, or both may be omitted. For instance, a first end of the arcuate wall 162 may extend from an end of the first side wall 170 when the first connecting wall 164 is omitted. Similarly the second end of the arcuate wall 162 may extend from an end of the second side wall 172 when the second connecting wall 166 is omitted.

At least one hub air passage 136 may be provided with the hub 22. A hub air passage 136 may fluidly connect the annular hub chamber 134 to a tire 110. The hub air passage 136 may be defined in the hub 22 and may extend through the hub 22. In FIG. 3, two hub air passages 136 are illustrated. For convenience in reference, the hub air passages 136 may be referred to as a first hub air passage and a second hub air passage. The first hub air passage and the second hub air passage may be disposed on opposite sides of the spindle 20. The first and second hub air passages may be fluidly connected to a common tire 110 and wheel 112 or may be fluidly connected to different tires 110 and wheels 112 as will be discussed in more detail below. In at least one configuration, the first hub air passage may be disposed directly opposite the second hub air passage such that the first hub air passage and the second hub air passage may be coplanar. As is best shown in FIG. 4, the hub air passage 136 may have a first port 180 and a second port 182. The hub air passage 136 may also have a first segment 184, a second segment 186, and a third segment 188.

The first port 180 may be fluidly connected to the annular hub chamber 134. For instance, the first port 180 may extend from the arcuate wall 162. The first port 180 may be axially positioned further from the distal end of the spindle 20 than the port 160 of the annular hub chamber 134 is positioned from the distal end of the spindle 20.

The second port 182 may be disposed at an opposite end of the hub air passage 136 from the first port 180. The second port 182 may be fluidly connectable to a wheel 112, such as via a conduit as will be discussed in more detail below.

The first segment 184 may extend from the annular hub chamber 134. For instance, the first segment 184 may include the first port 180 and may extend from the annular hub chamber 134 at an oblique angle with respect to the axis 40.

The second segment 186 may fluidly connect the first segment 184 to the third segment 188. For instance, the second segment 186 may extend from the first segment 184 in a direction that extends away from the axis 40. In at least one configuration, the second segment 186 may be disposed substantially perpendicular to the axis 40. Substantially perpendicular may be within ±2° of perpendicular.

The third segment 188 may extend from the second segment 186 to the second port 182. In at least one configuration, the third segment 188 may extend substantially parallel to the axis 40. Substantially perpendicular may be within ±2° of parallel.

Referring to FIGS. 2 and 4, the inboard wheel bearing 24 may be disposed on the spindle 20 and may rotatably support the hub 22. The inboard wheel bearing 24 may have any suitable configuration. For instance, the inboard wheel bearing 24 may include a plurality of rolling elements, such as balls or rollers, that may be disposed between an inner race and an outer race. The inner race may extend around and may be disposed on a surface of the spindle 20, such as the third outer surface 96. As such, the inboard wheel bearing 24 may be axially positioned closer to the mounting flange 50 than the outboard wheel bearing 26. The outer race may engage the hub 22 and may extend around the inner race.

The outboard wheel bearing 26 may be disposed on the spindle 20 and may rotatably support the hub 22. The outboard wheel bearing 26 may have a similar configuration as the inboard wheel bearing 24. For instance, the outboard wheel bearing 26 may include a plurality of rolling elements, such as balls or rollers, that may be disposed between an inner race and an outer race. The inner race may extend around and may be disposed on a surface of the spindle 20, such as the first outer surface 92. The outer race may engage the hub 22 and may extend around the inner race.

The hub seal 28 may extend from the spindle 20 to the hub 22. For example, the hub seal 28 may extend from the fourth outer surface 98 of the spindle 20 in a direction that extends away from the axis 40 to the hub 22. The hub seal 28 may be disposed near an inboard end of the hub 22 that may be disposed closest to the mounting flange 50 of the spindle 20. The hub seal 28 may be axially positioned between the inboard wheel bearing 24 and the mounting flange 50.

The rotary seal assembly 30 may fluidly connect the spindle air passage 54 to the hub air passage 136. More specifically, the rotary seal assembly 30 may fluidly connect the second port 122 of the spindle air passage 54 to the port 160 of the hub air passage 136. The rotary seal assembly 30 may extend from the spindle 20 to the hub 22. For example, the rotary seal assembly 30 may extend from the second outer surface 94 of the spindle 20 in a direction that extends away from the axis 40 to the hub 22. The rotary seal assembly 30 may be axially positioned between the inboard wheel bearing 24 and the outboard wheel bearing 26. The rotary seal assembly 30 may seal against the spindle 20 and the hub 22 in a manner that permits the hub 22 to rotate with respect to the spindle 20. As one example, the rotary seal assembly 30 may be fixedly disposed on the spindle 20 such that the rotary seal assembly 30 does not rotate with respect to the spindle 20 and the hub 22 may rotate with respect to the rotary seal assembly 30. As another example, the rotary seal assembly 30 may be fixedly disposed on the hub 22 such that the hub 22 and the rotary seal assembly 30 may be rotatable with respect to the spindle 20.

The rotary seal assembly 30 may have any suitable configuration. For instance, the rotary seal assembly 30 may extend continuously around the spindle 20 and may have an inboard sealing portion 200 and an outboard sealing portion 202. The inboard sealing portion 200 may extend from the spindle 20 to the hub 22 and may be axially positioned between the inboard wheel bearing 24 and the second port 122 of the spindle air passage 54. The outboard sealing portion 202 may extend from the spindle 20 to the hub 22 and may be axially positioned between the outboard wheel bearing 26 and the second port 122 of the spindle air passage 54. As such, the spindle 20, the hub 22, the inboard sealing portion 200, and the outboard sealing portion 202 may cooperate to define a chamber from which the second port 122 of the spindle air passage 54 and the port 160 of the annular hub chamber 134 may extend.

Referring to FIGS. 1 and 2, the hub housing 34 may be mounted to the hub 22. For example, the hub housing 34 may be attached to an end of the hub 22 that faces away from the mounting flange 50 of the spindle 20. The hub housing 34 may enclose an outboard end of the hub cavity 130.

Referring to FIGS. 2 and 3, the axle shaft 32, if provided, may provide torque to the wheel end assembly 10. For instance, the axle shaft 32 may be operatively connected at a first end to a vehicle drivetrain component, such as a differential or vehicle power source, and may be coupled to or operatively connected to the wheel end assembly 10 at a second end. In at least one embodiment, the axle shaft 32 or a portion thereof may extend along the axis 40. For example, the axle shaft 32 or a portion thereof may extend through the spindle hole 56 and may be operatively connected to the hub 22, such as via the gear reduction unit 38 or without the gear reduction unit 38. It is also contemplated that the axle shaft 32 may be configured for use with an independent suspension system and may have multiple shaft segments and/or joints that may facilitate relative movement between the first end and the wheel end assembly 10.

The hub housing 34, if provided, may be fixedly mounted to the hub 22. As such, the hub housing 34 and the hub 22 may be rotatable together about the axis 40 with respect to the spindle 20. The hub housing 34 may extend around and may at least partially receive the spindle 20, the hub 22, the outboard wheel bearing 26, the rotary seal assembly 30, the annular hub chamber 134, or combinations thereof. The hub housing 34 may also receive the gear reduction unit 38. In at least one configuration and as is best shown with reference to FIG. 4, the hub housing 34 may include a hub housing flange 210 and at least one hub housing passage 212.

The hub housing flange 210 may be disposed at an end of the hub housing 34 that may face toward the hub mounting flange 132. The hub housing flange 210 may extend away from the axis 40 and may have a first flange side 220 and a second flange side 222.

The first flange side 220 may face toward the hub mounting flange 132. For example, the first flange side 220 may engage or contact the hub mounting flange 132.

The second flange side 222 may be disposed opposite the first flange side 220. The second flange side 222 may face toward and may engage or contact the brake drum 36.

The hub housing passage 212 may be configured as a through hole that may extend from the first flange side 220 to the second flange side 222. A different hub housing passage 212 may be associated with each hub air passage 136. For instance, a hub housing passage 212 may be aligned with and may be fluidly connected to a corresponding hub air passage 136.

Referring to FIGS. 1 and 2, the brake drum 36 may be fixedly mounted to the hub 22. As such, the brake drum 36 and the hub 22 may be rotatable together about the axis 40 with respect to the spindle 20. The brake drum 36 may extend around and may at least partially receive the spindle 20, the hub 22, the inboard wheel bearing 24, the rotary seal assembly 30, the annular hub chamber 134, or combinations thereof. The brake drum 36 may also receive one or more brake pad assemblies in a manner known by those skilled in the art. In at least one configuration and as is best shown with reference to FIG. 4, the brake drum 36 may include a brake drum flange 230 and at least one brake drum passage 232.

The brake drum flange 230 may be disposed at an end of the brake drum 36 that may face toward the hub mounting flange 132. The brake drum flange 230 may extend toward the axis 40 and may have a first brake drum flange side 240 and a second brake drum flange side 242.

The first brake drum flange side 240 may face toward the hub mounting flange 132. For example, the first brake drum flange side 240 may engage or contact the hub housing flange 210 or may engage or contact the hub mounting flange 132 if a hub housing 34 is not axially positioned between the hub 22 and the brake drum 36.

The second brake drum flange side 242 may be disposed opposite the first brake drum flange side 240. The second brake drum flange side 242 may face toward and may engage or contact a wheel 112.

The brake drum passage 232 to may be configured as a through hole that may extend from the first brake drum flange side 240 to the second brake drum flange side 242. The brake drum passage 232 may be aligned with and may be fluidly connected to a corresponding hub air passage 136. For instance, a brake drum passage 232 may be disposed adjacent to and may be fluidly connected to a hub housing passage 212 and the hub housing passage 212 may be disposed adjacent to and may be fluidly connected to the hub air passage 136. It is also contemplated that the axial positioning of the hub housing 34 and the brake drum 36 may be reversed, in which case the brake drum flange 230 may be disposed between the hub housing flange 210 and the hub mounting flange 132. It is also contemplated that the hub housing 34 may be omitted and that the brake drum 36 may be disposed adjacent to the hub mounting flange 132.

One or more seals may be provided to inhibit leakage of pressurized gas. For instance, a first seal 250 may be disposed between and may contact or engage the hub mounting flange 132 and the hub housing flange 210 while a second seal may be disposed between and may contact or engage the hub housing flange 210 and the brake drum flange 230. For instance, the first seal 250 may contact or engage the first flange side 220 and may extend around the hub housing passage 212 while the second seal 252 may contact or engage the second flange side 222 and may extend around the hub housing passage 212. The seal may have any suitable configuration. For instance, a seal may be configured as an O-ring, gasket, or the like.

Referring to FIG. 3, a conduit 260 may fluidly connect a hub air passage 136 to a wheel 112. In the configuration shown, two conduits 260 are depicted. Each conduit 260 may be fluidly connected to the same tire 110 and wheel 112 or may be fluidly connected to different tires 110 and wheels 112. For instance, one conduit 260 may fluidly connect one hub air passage 136 to a first wheel 112 while a second conduit 260 fluidly connects the other hub air passage 136 to a second wheel 112. As such, multiple tires may be inflated or deflated via the conduits 260. Alternatively, a single tire 110 and wheel 112 may be mounted on the hub 22 and both conduits 260 may be fluidly connected to the same wheel 112, such as via two separate fittings or tire valves that may be provided with the wheel 112. As such, the volume of air that may be provided to a tire 110 or removed from a tire 110 and/or the air flow rate may be increased, which may help reduce tire inflation and/or deflation times.

In at least one configuration, each conduit 260 may extend through a different opening in a wheel 112. A conduit 260 may extend from the brake drum 36 and may be fluidly connected to the brake drum passage 232; however it is also contemplated that the conduit 260 may extend from the hub housing 34 and an associated hub housing passage 212 or a conduit 260 may extend from the hub mounting flange 132 and an associated hub air passage 136.

The gear reduction unit 38, if provided, may operatively connect the axle shaft 32 to the hub 22. The gear reduction unit 38 may be at least partially disposed in the hub 22 and may transmit torque from the axle shaft 32 to the hub 22. The gear reduction unit 38 may have any suitable configuration. For instance, the gear reduction unit 38 may be configured as a planetary gear set. The gear reduction unit 38 may be disposed proximate the distal end of the spindle 20 and may be received in the hub housing 34.

A wheel end assembly as described above may allow a tire inflation system to route pressurized gas through a spindle and a hub rather than through external tubing or hoses that may be received inside the spindle hole or that may extend along an exterior surface of a hub, which may help reduce package space and avoid damage to which external tubing is susceptible. Routing pressurized gas through passages in a brake drum and/or hub housing may help further internalize the flow path for pressurized gas. Providing internal flow passages for pressurized gas may also help reduce potential leak paths and connection points. Providing an internal annular hub chamber may permit pressurized gas to be provided to multiple hub passages, which in turn may allow multiple tires to be inflated or may facilitate multiple fluid connections to a single tire, which may allow a greater volume of air to be provided to or exhausted from a tire and/or may decrease tire inflation and deflation times, thereby improving performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
a spindle that is disposed along an axis and that defines a spindle air passage;
a hub that is rotatable about the axis with respect to the spindle, the hub defining an annular hub chamber that extends around the axis and a hub air passage that has a first port that is fluidly connected to the annular hub chamber and a second port that is adapted to be fluidly connected to a wheel;

a rotary seal assembly that fluidly connects the spindle air passage to a port of the annular hub chamber, wherein the port of the annular hub chamber extends continuously around the axis; and a brake drum that is mounted to the hub, wherein the brake drum has a brake drum passage that is fluidly connected to the second port of the hub air passage.

2. The wheel end assembly of claim 1 wherein the spindle defines a spindle hole that extends along the axis and that is spaced apart from the spindle air passage.

3. The wheel end assembly of claim 1 wherein the hub defines a second hub air passage that has a first port that is fluidly connected to the annular hub chamber and a second port.

4. The wheel end assembly of claim 3 wherein the hub air passage and the second hub air passage are coplanar and are disposed on opposite sides of the spindle.

5. The wheel end assembly of claim 1 wherein the hub further comprises an inner side that faces toward the spindle, and the port is at least partially defined by a first side wall and a second side wall that are spaced apart from each other and that extend away from the spindle from the inner side.

6. The wheel end assembly of claim 5 wherein the port of the annular hub chamber extends continuously around the axis.

7. The wheel end assembly of claim 5 wherein the hub air passage has a first segment that extends from the annular hub chamber at an oblique angle with respect to the axis, a second segment that extends from the first segment away from the axis, and a third segment that extends from the second segment substantially parallel to the axis.

8. The wheel end assembly of claim 5 wherein the annular hub chamber is partially defined by an arcuate wall that faces toward the axis and that extends along an arc.

9. The wheel end assembly of claim 8 wherein the first port of the hub air passage extends from the arcuate wall.

10. The wheel end assembly of claim 8 wherein at least a portion of the arcuate wall is disposed further from the axis than first and second wheel bearings that rotatably support the hub on the spindle.

11. The wheel end assembly of claim 8 wherein a first connecting wall extends from an end of the first side wall to a first end of the arcuate wall.

12. The wheel end assembly of claim 11 wherein a second connecting wall extends from an end of the second side wall to a second end of the arcuate wall that is disposed opposite the first end of the arcuate wall.

13. A wheel end assembly comprising:
a spindle that is disposed along an axis and that defines a spindle air passage;
a hub that is rotatable about the axis with respect to the spindle, the hub defining an annular hub chamber that extends around the axis and a hub air passage that has a first port that is fluidly connected to the annular hub chamber and a second port that is adapted to be fluidly connected to a wheel;
a rotary seal assembly that fluidly connects the spindle air passage to a port of the annular hub chamber, wherein the port of the annular hub chamber extends continuously around the axis; and
a hub housing that is mounted to the hub and that at least partially receives the hub and the spindle, wherein the hub housing has a hub housing passage that is disposed adjacent to and is fluidly connected to the second port of the hub air passage.

14. The wheel end assembly of claim 13 further comprising a brake drum that is mounted to the hub housing, wherein the brake drum has a brake drum passage that is disposed adjacent to and is fluidly connected to the hub housing passage.

15. The wheel end assembly of claim 14 wherein the hub housing and the brake drum extend around the annular hub chamber.

16. The wheel end assembly of claim 14 further comprising a conduit that fluidly connects the brake drum passage to the wheel.

17. The wheel end assembly of claim 14 wherein the hub housing has a hub housing flange that extends away from the axis, the hub housing flange having a first flange side that engages the hub and a second flange side that is disposed opposite the first flange side that engages the brake drum.

18. The wheel end assembly of claim 17 further comprising a first seal that is disposed between the hub housing flange and the hub and a second seal that is disposed between the hub housing flange and the brake drum.

19. A wheel end assembly comprising:
a spindle that is disposed along an axis and that defines a spindle air passage;
a hub that is rotatable about the axis with respect to the spindle, the hub defining an annular hub chamber that extends around the axis, a hub air passage that has a first port that is fluidly connected to the annular hub chamber and a second port that is adapted to be fluidly connected to a wheel, and a second hub air passage that has a first port that is fluidly connected to the annular hub chamber and the second port; and
a rotary seal assembly that fluidly connects the spindle air passage to a port of the annular hub chamber, wherein the port of the annular hub chamber extends continuously around the axis, wherein the port of the annular hub chamber is axially positioned closer to a distal end of the spindle than the first port of the hub air passage and the first port of the second hub air passage.

20. The wheel end assembly of claim 19 further comprising a brake drum that is mounted to the hub, wherein the brake drum has a brake drum passage that is fluidly connected to the second port of the hub air passage.

* * * * *